United States Patent [19]

Street et al.

[11] 4,401,055

[45] Aug. 30, 1983

[54] ANIMAL PROTECTIVE APPARATUS AND METHOD FOR PROTECTING THE ANIMAL FROM ELECTRICAL POWER

[76] Inventors: William L. Street, 1833 N. 20th St., Sheboygan, Wis. 53801; James W. Summers, Rte. 1, Oostburg, Wis. 53070

[21] Appl. No.: 289,160

[22] Filed: Aug. 3, 1981

[51] Int. Cl.³ .............................. A01J 7/00; A01J 5/00
[52] U.S. Cl. ................................. 119/14.03; 119/14.08
[58] Field of Search ................. 119/14.03, 14.08, 14.14

[56] References Cited

U.S. PATENT DOCUMENTS

| | | | |
|---|---|---|---|
| 3,991,716 | 11/1976 | Reisgies | 119/14.08 |
| 4,000,718 | 1/1977 | Brown | 119/14.03 |
| 4,188,910 | 2/1980 | Hocker | 119/14.08 |
| 4,355,595 | 10/1982 | Ackerman et al. | 119/14.03 |

*Primary Examiner*—Robert P. Swiatek
*Attorney, Agent, or Firm*—Andrus, Sceales, Starke & Sawall

[57] ABSTRACT

An automated milking system includes galvanized metal stall structures, and in a parlor system a galvanized metal grate for the hind feet of a cow. An extraneous voltage protective unit is provided to prevent initiating electrical current flow in the cow because of small extraneous voltages which may be created in the milking system. The milking machines include a stainless steel claw and a plastic transfer hose to a similar steel collection pipe. A stainless steel pipe is inserted in the hose. A voltage compensator/sensor is coupled to the claw and the pipe insert to monitor the claw and generate a compensating voltage applied to the milking system to neutralize, compensate or otherwise effectively eliminate current flow through the cow at the udder. An A.C. signal monitor and a total signal monitor are coupled to the circuit to monitor and indicate stray alternating current voltages in the system, to monitor and indicate the sum of D.C. voltages and A.C. voltages in the system. A limit control may detect a voltage along a selected limit and disconnect the protective apparatus and indicate such condition.

13 Claims, 3 Drawing Figures

ANIMAL PROTECTIVE APPARATUS AND METHOD FOR PROTECTING THE ANIMAL FROM ELECTRICAL POWER

BACKGROUND OF THE PRESENT INVENTION

This application relates to an animal protective method and apparatus for protecting the animal from electrical power and particularly for protecting cows during automatic mechanized milking and the like from electrical power.

The milking of cows has developed over the years from a completely manual hand operation to a highly automated mechanized process. In an automated pipeline system, the cows may be placed during milking in a conventional farm building having a plurality of stanchions for housing each of the several cows. A pipeline is secured above the stanchions and one or more milking machines are provided for selective connection between the pipeline and the individual cows. The milking machine includes a teat cluster or claw unit for having individual coupling cups for connection to the teats of the cow's udder. The cups are joined to a common collector or claw member, and a flexible, coupling hose formed of a suitable plastic or the like connects the claw to the transfer or collection pipeline. The pipeline transports the milk to a common collection station, normally a large storage tank.

In an alternate and widely used system, the cows are brought in groups to a milking parlor which is a relatively small area having a plurality of milking stations, such as twelve or more stations stalls. The stalls are located along or to opposite sides of an operator pit to locate the cow's udders at a convenient location for washing before and treating after interconnection to a milking machine. Thus, the cows are brought to the operator rather than the operator moving through a large milking area. Each stall includes confining wall-like barriers formed of a suitable galvanized metal piping, formed sheets or the like. The floor is provided with a grate-covered trough on which the rear legs of the cow are located during milking. The grating covers the troughs for collection of the excrement of the cows. The milking machine at each station again includes the coupling claw for manual connection to the cow's teats with flexible plastic tubing interconnecting the claw to a collection piping which in turn is connected to a collection tank.

In either system the cows' udders are washed before and treated after milking. The milking machines are similarly constructed of a stainless steel claw. The claw is in turn connected by flexible plastic tubing to the transfer pipe which is also formed of stainless steel and connected to a stainless steel collection tank.

Various sophisticated cow moving and treating milking parlors have been suggested but all basically may be classified within the general category of the pipeline system or the confined milking parlor. For example, U.S. Pat. No. 3,810,442, which issued in May 14, 1974, discloses a milking parlor using moving conveyors for locating of the cows in the milking stall. Various electrical equipment which is used in either system constitutes a possible source of electrical shocks if the mechanism should malfunction or the structural installation develop a defect. A severe electrical shock could seriously damage if not kill the cow. The above patent discloses the moving conveyor driven through an isolating drive system to isolate the conveying means from the electrical equipment.

The present inventors, however, recognize that a most significant but less apparent problem exists in automated milking systems and one which has been found may significantly adversely effect the milk release and production by a cow. In particular the inventors have recognized that a dairy farm and particularly automated milking systems include an extraneous voltage environment. In a mechanized milking system, the stall defining framework and structure in either of the basic systems is formed with galvanized metal or other like metal members. Similarly, in a milking parlor, the stall structure includes the floor grate covering the excrement trough and the floor grate is formed of a galvanized metal. As noted previously, the cows are washed and treated during the milking process. Further, movement of the cows into and from the milking area creates a wet area. The cow has been recognized by the inventors as creating an electrolytic conductor which with the milking apparatus and the stall defining structure defines a closed electrical loop. The inventors thus realized that notwithstanding isolation of electrical equipment or the like as has been suggested, the cow may well be and often is subjected to extraneous electrical power which may adversely effect the cow during milking. The inventors for example have discovered that the dissimilar metals used in the stalls and in the milking machine which are connected to and by the cow constitutes a galvanic battery which of course creates a source of power. Although the voltage is low, the cow is connected in good electrical connection to the dissimilar metals as the result of the firm connection of a cup and the conditioning or treating of the cows such as washing and the high moisture environment. Further, the cow forms a good electrolytical conductor and significant irritating current flow may be established. In addition, stray voltages may be coupled into the circuit loop of the milking system and produce an irritating current flow through the cow. Thus, stray voltages may arise from the utility power distribution system which is provided on the dairy farm as well as in other surrounding areas with various voltages and grounds as well as in other surrounding areas. The stray voltages may be created in the best of installations and may of course readily be created by leakage power from any faulty or improperly wired electrical equipment on the dairy farm. Although the cow is not necessarily damaged physically, the cow will react negatively during the milking and tend to withhold her milk. Thus the cow may become so conditioned to the adverse environment so as to react negatively whenever moved into the milking area.

Thus, it is known that the cow produces a hormone in response to stimulation of the teats to release the milk for a maximum period of six to eight minutes. Further, any disturbance of the cow at or just prior to milking generates a defense hormone which restricts the transmission, of the blood and the milk release hormone to the udder, and further may cause the cow to physically react. The cow may, for example, kick her hind legs and knock the milking machine cups off the teats, causing further physical discomfort, and at a minimum reducing the available optimum milking time by the time required to reconnect the milking machine. Further, kicking off the milking cups may even damage the udder. As a result of such disturbances, an incomplete milk let down or release may be created. This not only reduces the production at the particular milking cycle, but reduces the butter fat content and may have following adverse effect. Thus the highest butter fat level is present in the latter part, and generally the last half, of the milking cycle. If milk produced by the cow remains in the udder for a plurality of consecutive milkings, such as twenty, the quantity of milk produced between successive milkings is significantly reduced. Further, the cow may associate the milking area with the adverse condition, and react negatively even in the absence of such conditions.

SUMMARY OF THE PRESENT INVENTION

The present invention is particularly directed to an automated milking system in which the cow is protected from sources of extraneous electrical power such that the cow is milked in a relaxed condition so as to permit maximum release and production of milk.

In accordance with the broadest aspect of the present invention, the milking system could be constructed and arranged to prevent the creation and completion of the closed loop circuit inclusive of the cow during the milking operation. In accordance with a unique practical aspect of the invention, the potential presence of adverse voltage conditions within the closed loop are detected and a compensating means provided to effectively eliminate the effect of such adverse voltage conditions and prevent damaging current flow through the cow's udder and thereby permit the milking system to be constructed with substantially the same type of constructions presently in use.

The present invention in this latter aspect of the invention is uniquely and particularly adopted to use in a conventional automated milking system wherein the animal or the cow is confined within a confined milking location or where a plurality of the cows are confined within a plurality of adjacent milking locations having the adjacent stalls defined of galvanized metal confining members and milking machines including the stainless steel claws connected by a flexible transfer hose to a stainless steel collection and transfer pipeline system. In accordance with a preferred embodiment of the present invention, the transfer hose between the claw and the common collection pipeline is broken and provided with an electrically conductive tubing, such as a stainless steel pipe section or insert. The claw and the pipe insert provide electrical connection within the closed circuit loop of the milking system. The claw is essentially at the potential of the cow at the very sensitive udder location. An electrical potential or voltage sensing means is coupled between the claw and the pipe insert. Any significant potential difference is directly indicative of a condition which could adversely effect the cow. The potential may of course arise from any source including galvanic action, stray voltages and the like. In accordance with the one embodiment of this invention, such voltage is essentially continuously monitored and used to generate an opposing voltage connected in series into the milking system to neutralize, compensate or otherwise effectively eliminate the extraneous voltage introduced into the system.

In a particularly practical construction which has been used in an operating milking parlor environment, the claw and pipe insert are connected as the input to an operational amplifier connected in a follower configuration. The operational amplifier detects relatively minute voltage differences. The follower connection effectively generates a balancing of the voltage at the input as the result of the feedback connection, which thus compensates and neutralizes the sensed voltage difference to thereby effectively remove current flow in the closed loop milking system, particularly including the cow. In this manner, the cow is isolated from extraneous voltages, such as the galvanically generated voltages, induced stray voltages and the like. The inventors have found that this results at times in dramatic change in the release and therefore production of milk from the herd of cows.

The present invention in a preferred embodiment, preferably includes various monitoring and cutoff means to provide a continuous indication of the functioning of the protective apparatus. In a practical construction, an AC signal monitor is coupled to the circuit. This can take the form of an A.C. comparator which is capacitive coupled to the output of the compensating amplifier or compensating signal generator or other appropriate point in the circuit. The A.C. comparator is coupled to energize a lamp or other suitable indicating means. The A.C. monitor thus provides indication of stray alternating current voltages in the milking system, such as may be picked up in the system from the utility power system or the like.

A total voltage monitor unit is also coupled to the output of the compensating signal generator and senses the sum of the D.C. voltage and A.C. voltage. The monitor may conveniently take the form of a rectifying circuit having a pair of difference amplifiers connected in parallel and with isolating output diodes connected to a common D.C. signal line. One of the parallel amplifiers detects an increasing positive signal while the other detects an increasing negative signal from the compensating signal generator. The output signal line is connected to an D.C. indicator which is preferably constructed as a level detection unit. Bar graph indicators, for example, are commercially available including a plurality of LED lamp units interconnected to individual outputs of a suitable I.C. chip driver. The input of the driver is connected to the common output signal line and the number of lamps illuminated is directly related to the amplitude of the output signal.

If the compensating voltage rises above a limit level, an alarmed or fault condition may be indicated. In accordance with the present invention, the total voltage monitor system may be connected to a cutout and alarm unit to disconnect the voltage protective unit during such alarm condition, as well as indicate such condition. The output of the D.C. indicator can provide an amplitude related signal coupled to actuate a solid state switching circuit including an alarm indicator and a cutoff switch means for disabling and effectively isolating the protective unit from the milking system.

In one further practical aspect of the present invention, the protective apparatus uses readily available solid state chips, including operational amplifier chips, integrated circuit chips and the like. Such integrated circuit chips are often formed as dual element units, and the protective apparatus may advantageously and conveniently be constructed with dual stall control units. Each unit is then mounted between a pair of adjacent stalls and connected thereto to provide separate and independent connection and indication of the functioning of the corresponding adjacent stalls. The circuit elements of course are solid state components, some of which require a regulated power supply while other portions of the circuit operate from unregulated power supply. Each dual control unit may be provided with one single regulated supply means for supplying of power to the components of each of the dual units, and all the plurality of dual control units may be connected to a centrally located common unregulated power supply. Such a system provides a satisfactorily system with minimal cost.

The present invention has been found to provide a highly effective apparatus for protecting of the animal from the extraneous voltages and particularly stray voltages, galvanically created voltages and the like which exist in an automated milking system. The preferred embodiment using the voltage sensing and compensating control unit provides a particularly practical means of implementation for retrofitting existing units as well as providing an inexpensive modification and addition to new constructions.

DESCRIPTION OF THE DRAWING FIGURES

The drawings furnished herewith illustrate a preferred construction of the present invention in which the above advantages and features are clearly disclosed as well as others which will be readily understood from the following description.

DESCRIPTION OF THE ILLUSTRATED EMBODIMENT

Figure 1:
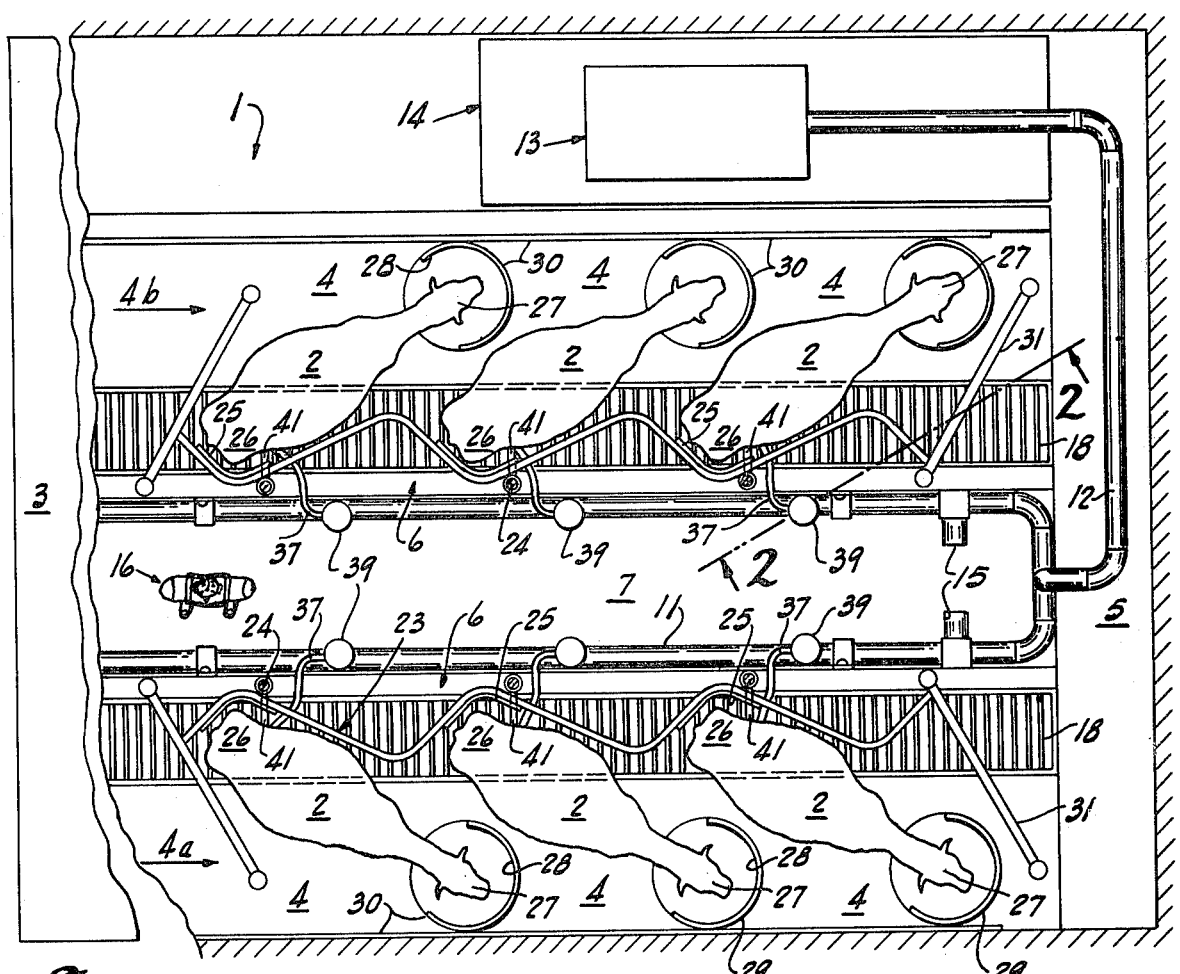
FIG. 1 is a plan and simplified view of a milking parlor incorporating one embodiment of the invention.
Figure 2:
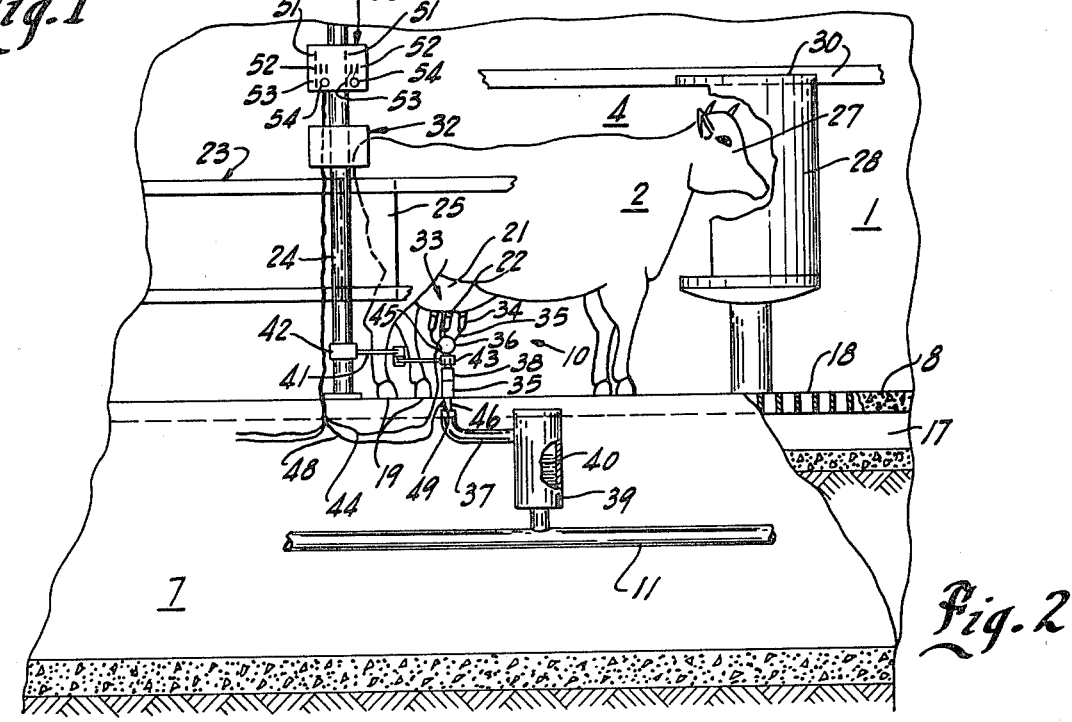
FIG. 2 is an enlarged fragmentary view of one station of the milking parlor shown in FIG. 1, and taken generally on line 2—2 of FIG. 1.

Referring to the drawings and particularly to FIGS. 1 and 2, the present invention is shown applied to a typical milking parlor 1 for batch milking of cows 2 forming a large herd. The herd of cows 2 is brought to the milking parlor at a front loading zone 3, and brought into the milking parlor in groups corresponding to the size of the milking parlor. Thus, the milking parlor 1 includes an outer enclosure with a plurality of milking locations or stalls 4, each of which houses one individual cow during milking. In the illustrated embodiment of the invention, the milking parlor shown of herringbone arrangement, includes two similar parallel banks 4a and 4b of stalls 4 to the opposite sides of the milking parlor 1 and extending from the loading zone 3 to an opposite return end 5. The stalls 4 are defined by the suitable dividing and cow confining wall units 6 which are located to angularly orient the cows 2 facing outwardly and in immediately adjacent relation. The cow 2 is thus confined with the udder located inwardly and with the cows 2 in each bank 4a and 4b similarly located with respect to a central operator pit 7. The pit 7 is dropped into the ground such that the operator is located at a convenient level with respect to the parlor floor 8 and the cows' udders for convenient treating of the cow's udder before and after attaching the detaching of a milking machine thereto, as most clearly shown in FIG. 2.

A separate milking machine 10 is located at each stall 4 and connected to a common collection or transfer pipeline 11. In the illustrated embodiment, the pipeline is a V-shaped member located and secured to the vertical wall of the operator pit 7 and includes a common connection line 12 to a storage tank 13 which is mounted in a separate area or building 14. The tank 13 is appropriately cooled for efficient and proper storage of the collected milk. In accordance with well known construction, the collection pipeline 11 is provided with a motor-driven lift pump unit 15 connected to the line within the operator pit. The unit 15 is of course located to create minimum interference with the movement of the operator 16. In addition, the milking parlor is constructed with an excrement collection trough 17 and located at each of the bank of stalls immediately aligned with the hind portions of the cows when properly located in the milking position in the stalls. The cow is closely confined within the stall with its hind feet 19 standing on the metal grating 18. The trough 17 is closed by a metal grating 18 forming a common continuation of the floor of the milking parlor 1 for convenient movement of the cows therethrough. The milking parlor 1 further may include a water and air hose unit, means for treating the cow's teats after milking and the like, not shown, which the operator uses to clean the cow's udder 21 and particularly the teats 22 prior to coupling of the milking machine unit 10 thereto.

The confining wall units 6 are similarly formed in a conventional structure of suitable galvanized metal such as galvanized wall sheeting, pipes and the like. The stalls 6 are shown formed by an outer wall adjacent the pit 7 including supporting frame 23 formed of suitable pipes or the like 24 and a specially shaped confining metal wall plate 25 which is curved to define a locating wall for the hind portion 26 of the cow 2. The frame member 24 and wall 25 are conventionally formed of a galvanized metal. The head 27 of the cow is confined adjacent the outer wall in a wall-mounted feeding assembly including a semi-circular vertical wall plate 28 partially enclosing a feed unit 29. The plate 28 is supported by a suitable framework 30, and the front wall and framework are also formed of a suitable galvanized metal. The units 6 are open structures with end gates 31 which are pivotally mounted between a confining position and a release position to allow the cow to move into and from the stalls. In the illustrated system, the cows move in parallel into the two banks, but in moving from the stalls, the cows in one bank move rearwardly while the cows in the opposite bank can move rearwardly and then forwardly around the return zone, through the opposite bank to the discharge zone.

As previously described, the supporting structure is conventionally formed of the galvanized metal which minimizes problems of rust and the like as well as reducing the cost of the installation.

The milking machine 10, the pipeline 11-12 and the storage tank 13 which directly carry and store the milk are formed of a stainless steel or other approved material particularly adapted for food handling. Thus, government regulations closely control and regulate the materials which can be employed in food handling equipment. Generally in the United States, food handling equipment must be formed of stainless steel or the like, except for certain interconnecting hoses and the like which can be formed of suitably approved plastics.

The confining stall structure 6 also normally includes a pipe structure immediately adjacent the pit 7 to which the automatic milking machine 10 and the associated milking control unit 32 are mounted in fixed relation. The milking machine 10 may be any suitable unit such as that manufactured and sold by Bou-Matic as a Bou-Matic double six herringbone model 2700M. The machine includes various vacuum and air operating devices and connections to properly milk the cow. The machine 10 is only partially, and in simplified form, shown and described as necessary to clearly understand this invention for purposes of clarity of explanation. Thus, in the illustrated embodiment of the invention the milking machine 10 includes an udder cluster 33 consisting of four teat cups 34 adapted to be coupled directly to the teats 22 of the cow 2 and connected by appropriate short tubing 35 to a common connector claw 36. A flexible hose 37 which may and conventionally is formed of a suitable plastic is connected to the claw and to the transfer or collection pipeline 12. A vacuum shut-off unit 38 is mounted within the hose 37 adjacent the claw 36 and a measuring bowl 39 is connected between the pipeline 11 and the connecting hose. The claw and hose assembly provides appropriate milking of the cow with metering and appropriate transfer of the milk 40 through the collection line 12 to the storage tank 13 in accordance with conventional construction.

The milking machine 10 and particularly the claw 36 is preferably mounted for convenient operator control. Thus, the claw 36 is shown secured by a pivotal linkage 41 to the fixed vertical pipe as at 42 of the confining stall structure. The illustrated pivotal linkage 41 is a collapsable multiple arm linkage which permits extension for locating of the claw 36 conveniently beneath the cow's udder 21 during the milking operation and retraction from beneath the cow and to the inside of the cow path after milking to allow convenient movement of the cow without interference and interengagement with the claw and milking machine 10.

The stall structure including the cow conditioning components and the metal grating are, as previously noted, formed of a galvanized metal. Such structure is coupled and connected to the ground structure of the milking parlor which in turn forms a common ground portion of a dairy farm. Further, the milking parlor 1 is inherently a high moisture environment, as a result of the cleansing of the cow for milking as well as movement from the barnyard into the parlor and the collection of the excretment of the cows.

The milking machine 10 as previously described consists of essentially stainless steel products except for the interconnecting hose 37 which is generally formed of a suitable plastic material and the rubber inflation cup liners. The claw 36 is thus isolated by the hose from the pipeline system. The pipeline system and storage tank in turn, although not necessarily directly connected to the parlor ground, are as a result of a farm environment connected to such parlor ground, and thus to the stall structure. The cow due to the high moisture conditions, acts as an electrolytic conductor between the milking claw 36 and the stall defining components including the stall units 23-25 and 28-30 and the metal grating 18. Further, even though the liner and plastic hose 37 would tend to function as an electrical isolating means, the milk flowing through the system, as well as surface moisture, creates an electrical connection between the claw 26 to the pipeline system 11-13. Thus, the conventional milking system defines a complete electrical circuit loop inclusive of the cow 2, the stall defining components and particularly grate 18 and the milking machine components 10-13, all connected in a series closed loop. Within this closed loop, applicant has realized that stray and extraneous voltages may be created even if all of the operating electrical equipment such as motors, lamps and the like, includes the usual means to effectively isolate and separate them from the milking machines. Thus, stray A.C. voltages exist in the ground plane within the system which may result from leakage currents in the system and particularly the ground system, and other stray signals which may be capacitively or inductively coupled into the milking system. Leakage from faulty or miswired equipment may also be coupled into the system directly. Although of a low level and therefore of no particular concern with respect to the operating personnel, the milking system is coupled to the cow in the highly sensitive body area of the cow's udder 21. Such small or minute voltages may not permanently damage the cow but may cause adverse reaction in the cow during the milking and prevent the cow from relaxing and totally releasing its milk. A particular source of extraneous voltage can arise as a result of the dissimilar metals used in the milking parlor and milking system. Thus, the galvanized metal and the stainless steel components in the closed loop are connected by the cow which constitutes a conductive electrolyte, which forms a galvanic battery of a voltage which can readily and is often on the level of 7/10 of a volt. The inventors have found such a voltage may create a significant current flow in the area of the udder through the low resistance of the cow, particularly in view of a moist environment and the good electrical contact of the cow to the ground environment such as at the grating 18 in the milking parlor and other stall structure in a pipeline system and of course the highly conductive connection of the milking machine to the cow's udder 21.

The cow may of course create various flow paths for the stray voltages. For example, current may flow between the feet of the cow as well as between the mouth and the feet. These current flows are not particularly sensitive areas or do not appear to form a source of most discomfort to the cow. However, the cow's udder 21 and teats 22, particularly during the milking process, is a most sensitive area, and is firmly connected into the previously described closed loop circuit. The current arising from such extraneous sources may significantly irritate the cow and cause the cow to be tense during milking, rather than relaxed. The present inventors discovered that such voltage conditions thus create a significant loss of milk to the dairy farmer.

The present invention is particularly directed to the concept and structures which effectively neutralize or compensate for such potentials being applied across the cow and effectively eliminate significant current flow through the cow such that maximum milk release can be obtained. One possible solution would be to transfer the milk through the insulating hose 37 as droplets or other form of discontinuity to break the loop circuit. Further, it would be possible of course to also devise and construct a milking parlor providing a highly isolated system by proper selection of materials and design which could minimize the current flow, and thereby directly providing for maximum efficiency on milking conditions. Those familiar with milking parlors, pipeline systems and a dairy farm environment will readily recognize that such a structural arrangement does not provide for convenient retrofitting of suggesting systems and may significantly increase the cost of the automated milking system. Implementation would be particularly difficult when applied to a milking pipeline system where a whole herd is housed in the barn and the milking machines brought to the cows, and the cost could readily become prohibitive.

Figure 3:
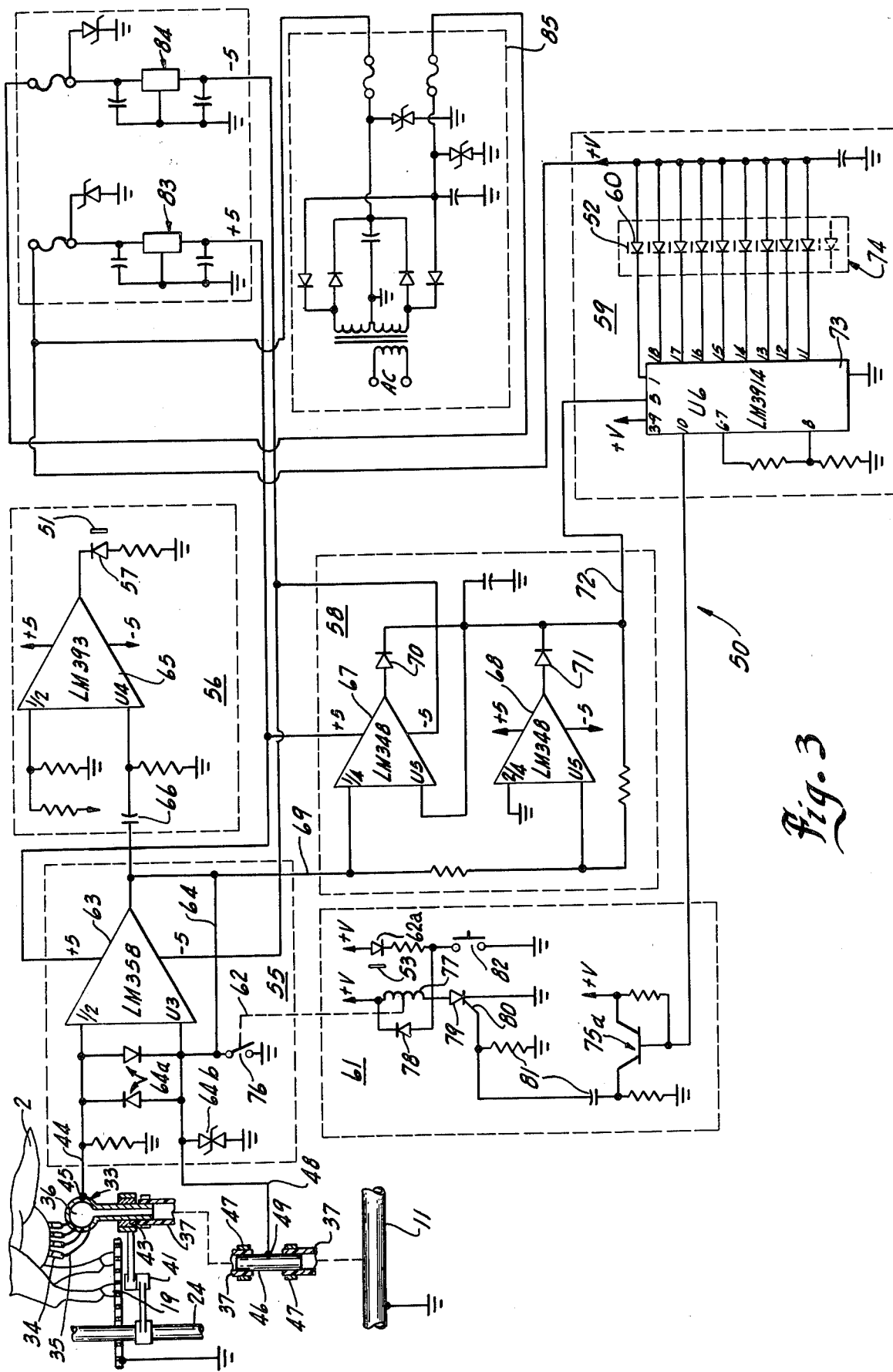
FIG. 3 is a schematic circuit illustration of a control unit shown in FIGS. 1 and 2.

A practical and convenient method and structure for effectively eliminating the current flow is shown in the illustrated embodiment of the invention in FIGS. 2 and 3 and includes a compensating means to balance the applied potential and thereby eliminate such applied potential as a current source.

Referring particularly to FIG. 2, the claw is attached to the pivot linkage 41 by an electrical insulating member 43 which electrically isolates the claw 36 and therefore the vacuum cups 34 from the stall defining galvanized piping and ground system. The claw 36 thus constitutes an isolated reference for sensing the potential appearing at the sensitive area of the cow.

A lead 44 having an end contact 45 is firmly connected to the claw 36 as by soldering, clamping or the like. The lead 44 provides a source of a potential signal corresponding to that at the cow's udder 21.

In the illustrated embodiment of the invention, the interconnecting stall hose 37 for each milking machine 10 is similarly constructed with a special conductive pipe insert 46. In order to meet government regulations and the like, the insert is a short stainless steel pipe secured at the opposite ends to the hose 37 by a fluid tight connection 47. A second sensing lead 48 has an end contact 49 secured to the pipe. The two leads 44-48 connected to the claw 36 and the insert pipe 46 establish series connection into the circuit loop of the milking system.

The leads 44 and 48 are connected to a control unit 50 including means for sensing of any potential difference between the leads 44-48 and essentially instantaneously compensating therefore by generating an opposing voltage. In this manner, the control unit neutralizes the effect of the extraneous voltages and eliminates significant current flow through the cow. Thus, the potential signal at the claw 36 with respect to ground is indicative of and related to the potential appearing across the cow 2 as the result of an external extraneous voltages or internally generated voltages, including those created by stray voltages coupled to the system and galvanically generated voltages within the system.

The illustrated control unit 50 is constructed as dual control unit having separate systems for controlling the two immediately adjacent stalls between which it is mounted. Thus, each control section or unit includes left and right. The control unit 50 includes a front panel having an A.C. voltage compensating indicator 51 and a total voltage compensating indicator 52. The A.C. indicator 51 is shown as a single illuminated unit. The A.C. indicator is lit whenever an A.C. voltage is detected in the milking system. The total voltage indicator 52 preferably includes a multiplicity of bar units, the number of which are energized in accordance with the amplitude of the total voltage detected and compensated for. The control preferably includes an alarm bar 53 which is energized if the voltages rise above a limit. As more fully developed, the limit or alarm control may also provide for operative disconnection of the control unit as a safety feature, and a reset button 54 is provided to allow resetting of the control unit. These and other controls may be introduced into the system as more fully described hereinafter with respect to a practical embodiment system which is schematically illustrated in FIG. 3.

Before proceeding with the detailed description of the embodiment, the milking operation and the functioning of the present invention is briefly summarized as follows.

At milking time, the herd of cows 2 is brought to the loading station. A first group of cows corresponding to the number of stalls 4 is separated from the herd and brought into the milking parlor 1 and loaded into the opposite banks of stalls. The operator 16 washes the udders 21 and teats 22 and then connects the claw cups 34 of the milking machine 10 to the aligned cow 2. This connects the cow for milking, and simultaneously however connects the cow into the closed loop electrical circuit including the milking machine, and stall structures including grate 18. Galvanically generated voltages, and stray voltages acting within the system, tend to create a potential difference across the cow. This potential difference is immediately detected at the control leads 44-48 and impressed on the control unit 50. The control unit 50 essentially instantaneously generates a compensating and opposing voltage which is connected in series within the loop and therefore in series with the stray and galvanic voltages, whichever may exist. The net current therefore flowing through the cow at the udder is essentially, if not, precisely zero. Consequently, without current flow through the cow, the cow is milked in a relaxed, non-disturbed condition. The level of A.C. and D.C. voltage is continuously monitored and as previously noted indicated on the control unit 50, such that the operator can readily determine the milking conditions. Thus, if abnormally large amplitudes of voltage are being continuously compensated for, as shown by the alarm indicator 53 or the total level indicator 52, the operator may wish to make a further check to locate a particular source and if necessary take appropriate steps to correct for such source.

A preferred embodiment of the present invention providing a separate A.C. voltage and a total A.C. and D.C. voltage condition monitoring as well as providing certain related safety controls is illustrated in FIG. 3.

Referring particularly to FIG. 3, the illustrated preferred embodiment of the invention includes a sensor/compensator unit 55 connected to the signal leads 44-48. The output of the sensor/compensator unit 55 is connected to an A.C. monitor detector 56 which is responsive to an A.C. voltage output of the unit 55 to energize a suitable light 57 for illuminating the indicator 51 of FIG. 1 whenever an A.C. signal of the selected or predetermined magnitude is detected.

The circuit includes a total voltage level monitor 58 which is also connected to the output of the sensor/compensator unit 55. The monitor 58 responds to both the A.C. voltage and the D.C. voltage appearing at the lead 44 or 48, and is constructed to provide an absolute value output signal for both negative and positive polarity voltage charges in the output of the unit 55. The monitor 58 produces a corresponding output signal to a multiple level display generator 59 for energizing a multiple of display lamps 60 associated with bars 52 of FIG. 1 in accordance with the amplitude of the absolute value output signal. As more fully described hereinafter, the lamps 60 are sequentially turned-on in response to a continuously increasing voltage level from the compensating unit 55 and provides for sequential amplitude related energization of the bar graph indicator shown in FIGS. 1 and 2.

In addition, a cutout unit 61 if provided connected to the output of the display generator 59 and operable in response to an abnormal limit output of the total voltage level monitor unit 58. The cutout unit 61 is operable to indicate an alarm condition and simultaneously actuate a relay cutoff switch 62 connected to the sensor unit 55 to affectively disconnect the control unit 50 from the circuit. A lamp 62a associated with indicator 53 of unit 50 is connected in parallel with the relay 62 to provide an indication of the operation of the cutoff unit and consequently the excessive or abnormal voltage condition.

The illustrated sensor compensating unit 55 is shown including an operational amplifier 63 connected in a follower configuration. The operational amplifier is a well known device and is shown with its positive input connected to the claw lead 44 and its negative input connected to the insert lead 48. A feedback lead 64 directly connects the output to the negative input terminal in common with the insert lead connector and establishes a follower circuit. The usual protective limit diode network 64a is connected across the two input terminals and the negative input terminal is connected to ground by an A.C. limit diode unit 64b. Thus, in operation the amplifier is driven as the result of the follower connection to produce an output necessary to produce the necessary voltage to maintain the potential of the inputs at the same potential. The positive terminal is thus connected to the potential of the claw 36 with respect to ground and the feet 19 of the cow 2. The negative input is connected to the insert pipe 46 and as a result of the follower circuit connection is driven to equal the potential of the positive input. If the potential at the claw 36 increases or decreases as a result of any internal voltages, such as a stray voltage, a galvanic voltage or the like, this voltage would tend to create a current flow through the loop including the cow 2. A change in voltage is however immediately sensed at the input of amplifier 63 as a difference across its input and the operational amplifier 63 is driven to change its output to readjust the potential of the negative input to equal the potential at the claw input, thereby generating an opposing and compensating voltage across its input and in series with the circuit loop which cancels or neutralizes and thereby neutralizes the effect of internal extraneous voltage sources. In the preferred embodiment as applied to a milking parlor, the connection of the cow 2 to the grate 18 at the hind feet 19 establishes such connection as a reference for the claw potential. The insert pipe connection 46 establishes a voltage dividing system connected into circuit through the amplifier 63 and particularly to the reference through the regulated power supplies 83, and 84, as hereinafter described. This thus establishes parallel circuit from the compensation potential source, one of which includes the circuit through the cow to the grate and the opposite of which is through the pipeline to ground. With the direct connection at the cow's feet, stray A.C. voltages are generally restricted to that part of the circuit to the pipeline system from the insert connection 46 to ground, with the compensating means providing a bypass which prevents the usual current flow through the cow. In a milking pipeline system which does not include a grate and wherein the connection to the cow is through the confining wall structure, the stray A.C. voltages may more readily be included within the portion of the circuit inclusive of the cow. Thus, the follower amplifier 63 continuously functions to vary its output in such a manner as to apply a neutralizing potential, or bypass current from the cow, which positively prevents creation of irritating current through the loop and therefore through the cow. The output voltage of the operational amplifier 63 is of course directly related to any A.C. or D.C. voltage generated within the loop.

The operational amplifier may be of any suitable design or construction. Applicants have employed a LM358 operational amplifier manufactured and sold by National Semiconductor, Inc. connected in a standard follower circuit with the usual protective circuit connections, as shown.

The A.C. monitor circuit 56 is shown including a solid state voltage comparator 65. The input circuit is capacitive coupled by a capacitor 66 to the output of the compensating operational amplifier 63. Any A.C. output of the operational amplifier 63 is coupled to the input of the comparator 65. The comparator 65 produces a signal which is coupled to drive the LED indicating light 57, if the A.C. input is above the reference input to the comparator 65. The light would be mounted behind an indicator 51 mounted on the front wall of the control unit 50 to provide an indication thereof. The comparator 65 is shown as a LM393 chip.

The total voltage monitor unit 58 which is also connected to the output of the operational amplifier 63 is similarly shown formed of a plurality of readily available commerical components.

The monitor unit 58 is a full wave rectifier means and includes a pair of operational amplifiers 67 and 68 connected in parallel to the output of the compensating operational amplifier 63. The amplifiers 67 and 68 are oppositely connected with the one amplifier 67 having its positive input connected to the output signal line 69 to produce an output in response to a positively increasing signal and the amplifier 68 having its negative input connected to line 69 to produce an output in response to a negatively increasing signal. The outputs of amplifiers 67 and 68 are connected by a unidirectional conducting element shown as blocking diodes 70 and 71 to a common output line 72. An absolute D.C. signal is generated in response to, and in proportion to, the variation in the compensating output voltage appearing at line 69 and is thus proportional to the sum of both the D.C. voltages and the A.C. voltages in the system. This signal is connected to drive the signal generator 59 in accordance with the amplitude of the D.C. signal.

The display generator 59 is shown including a sequencing output chip 73 shown as integrated circuit unit member LM3914. The input is connected to line 72 and the chip 73 is operable to generate a signal at a series of outputs which are connected to drive a ten bar graph display 74. The display 74 consists of ten LED lamps 60, each aligned with a display bar on 52 the front of the control unit 50. In the illustrated embodiment, nine of the LED lamps 60 are shown forming a part of the bar graph display 52 for indicating the amplitude of the D.C. signal in accordance with the number of the lamps and therefore bars 52 which are illuminated. As the input voltage increases, the lamps 60 are sequentially turned on. For example, the first lamp connected to the first output of unit 73a may turn on at three tenths of a volt, the next adjacent lamp would turn on at 6/10 of a volt and each of the others would be turned on in response to a corresponding 3/10 of a volt increase.

The tenth LED lamp is shown in dotted outline within the bar graph display unit 74 and constitutes the lamp 62a connected as a part of the cutoff unit 61. The tenth lamp indicates that the voltage has reached the limit level which operates the cutoff unit 61.

The illustrated cutoff unit is a solid state switching circuit including an input transistor 75a of a PNP type, such as a 2N3906 transistor. The transistor 75a connects power to actuate the relay switch unit 62. In the illustrated embodiment of the invention, relay switch unit 62 includes a set of contacts 76 connected between the negative input terminal, and the signal line 48 of the sensor circuit, to ground. Contacts 76 are normally open and closed in response to an abnormal condition to connect the output of the amplifier directly to ground and thereby effectively remove the operation of the sensor/compensating operational amplifier 63, thereby removing the control unit 50 from the system.

The relay may be a conventional reed-type 831A/4 which includes a relay winding 77 in parallel with a protective diode 78. The relay unit 77 is connected in series with a controlled rectifier 79 to power. The rectifier 79 is a well known electronic switch which is normally off. The rectifier includes a gate 80 to turn the switch on in response to an appropriate gate signal pulse. Once the rectifier 79 is turned on, it remains on independently of the gate current to hold relay 62 energized until reset. The gate 80 is connected by an R.C. network 81 to the output of the input transistor 75a. Whenever the monitored voltage rises above the limit level, the transistor is driven on and a pulse is supplied through the R.C. network 81 to the gate 80, which turns on the rectifier and establishes current flow in the relay winding 77. The contacts 76 instantaneously close to bypass the output to the unit 63 to ground. The rapid acting relay is desired in the event there is an increase in the voltage which would indicate a malfunction in the milking system. Further, the protective unit is driven from a five volt supply and such a voltage could create serious damage if applied directly to the cow.

In the illustrated embodiment of the invention, the tenth bar graph LED 63 is connected in parallel with the relay winding 77 and is thus energized simultaneously therewith. This of course illuminates the indicating bar 53 and signals the operation of the disconnect unit 61.

To permit resetting of the cutout circuit, a reset switch is connected in parallel with the rectifier 79 to ground. When the reset switch 82 is closed, the holding current to the rectifier is bypassed to ground and the rectifier reset to its nonconducting state. Once returned to the nonconducting state, it remains in such state until such time as a pulse signal is again applied to the gate 80.

Each of the control units 50 consists of a pair of the stall control monitors. Thus, the circuit of FIG. 3 would be duplicated and mounted on a common box.

The control units use solid state components in the monitoring and switching circuits, which in part require regulated power supplies, while other components can be driven with an unregulated power supply. Each control unit 50 is therefore constructed with one positive regulated power supply 83 and one negative regulated power supply 84 connected to the corresponding components in each of the dual circuits of a control unit 50. A common unregulated power supply 85 is provided for driving all of the multiple control units 50 provided as a part of the milking system. This of course minimizes the cost of the control system while providing appropriate and necessary voltages.

Various modes of carrying out the invention are contemplated as being within the scope of the following claims, particularly pointing out and distinctly claiming the subject matter which is regarded as the invention.

We claim:

1. A milking system for milking of a plurality of cows comprising a cow locating means including electrically conductive structure engaging the cow during the milking operation,
    a milking machine having milking elements adapted to be coupled to a cow's udder in said milking location and having an electrically insulated flow passageway means for delivery of milk to a collection means, said milk adapted to from a conductive path through said passageway means,
    means forming an electrical connection between said electrically conductive structure and said passageway means whereby a closed loop circuit is created in the milking system and voltages in said system can create current flow through said cow between said udder and said conductive structure, and
    electrical control means coupled to said milking machine and connected to prevent current flow through said udder and said conductive structure by producing a compensating voltage.

2. The milking system of claim 1 wherein said electrical control means includes sensing means to detect a potential difference existing between said udder and said electrically conductive structure, and said electrical control means includes a voltage compensating means to effectively eliminate current flow resulting from said potential difference.

3. The milking system of claim 2 having a plurality of adjacent stalls, a milking machine at each of said stalls including an udder coupling cluster having individual teat nipple cups connected to an electrically conductive claw and a discharge hose formed of a non-conductive tubular material connected to said claw, said hose including an intermediate conductive tubular insert, said sensing means including a voltage sensor connected to said claw and to said insert, and said compensating means including a voltage generating means connected in circuit with said sensor and operable to create an opposing voltage between said insert and said conductive structure.

4. The milking system of claim 3 including a cleaning trough forming a floor portion of said stalls in the location of the hind legs of the cows, and said conductive structure including a galvanized metal grate located in the upper portion of the trough.

5. A milking apparatus for automatic milking of a plurality of cows housed in a plurality of adjacent stalls, comprising
    a milking machine including an udder coupling cluster having individual teat cups connected to an electrically conductive claw and a discharge hose formed of a non-conductive tubular material connected to said claw, said hose including an intermediate conductive tubular insert,
    a collection pipeline connected to said hose,
    stall structure formed of metal mounted in spaced relation to define said stalls for locating of cows in predetermined similar orientation,
    each cow forming an electrolyte connection between said milking machine and said stall structure and establishing an electrically conductive system,
    a voltage sensor connected to said claw and to said insert to detect any potential difference therebetween, and
    a voltage compensating means connected in circuit with said sensor and operable to reduce said potential difference and thereby effectively eliminate current flow through the system including said cow.

6. The milking apparatus of claim 5 wherein said stall structure includes a cleaning trough forming a floor portion of said stalls in the location of the hind legs of the cows, a metal grate located in the upper portion of the trough.

7. The milking apparatus of claim 6 wherein said stall structure and said metal grate are formed of galvanized metal, and said claw and pipeline being formed of stainless steel and with said cow defining a battery developing a voltage between the claw and said stall structure.

8. The milking apparatus of claim 5 or 6 including an A.C. signal monitor connected to said sensor and operable to activate an output means in response to a detected A.C. signal.

9. The milking apparatus of claim 5 including a signal monitor connected to said sensor and operable to activate an output means in response to a detected signal.

10. The milking apparatus of claim 9 including a level detecting means connected to said signal monitor and operable to activate a level indicating means to indicate the amplitude of the detected signal.

11. The milking apparatus of claim 9 including a circuit disconnect means connected to operably disconnect said voltage compensating means from said cow and connected to said signal monitor to operate in response to a selected monitor output.

12. The milking apparatus of claim 5 including a signal monitor connected to said sensor and creating an output signal of an amplitude corresponding to the level of the compensating voltage, a level detecting means connected to said signal monitor and establishing a visual output of the amplitude of the compensating voltage, and a limit control means connected to said level detecting means and actuated in response to a selected monitor output.

13. An animal milking system comprising a stall means for locating of the cows during a milking operation process, said stall means including conductive means engaged by the cow, an automated milking machine having udder connecting means and a hose means for transfer of milk from the cow to a collecting means, electrical potential balance means connected to said stall means and said milking machine and constructed and arranged to prevent creation of an effective potential difference between the cow's udder and said stall means by producing a compensating voltage whereby the cow is protected against current flow therethrough when connected to said milking machine.

* * * * *